(12) United States Patent
Guo et al.

(10) Patent No.: US 9,042,406 B2
(45) Date of Patent: May 26, 2015

(54) METHOD FOR OBTAINING IPV6 CONFIGURATION INFORMATION IN IPV6 TRANSITION NETWORK, SYSTEM AND APPARATUS

(75) Inventors: Dayong Guo, Beijing (CN); Xiaohu Xu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 8 days.

(21) Appl. No.: 13/570,894

(22) Filed: Aug. 9, 2012

(65) Prior Publication Data

US 2012/0307841 A1    Dec. 6, 2012

Related U.S. Application Data

(63) Continuation of application No. PCT/CN2011/070908, filed on Feb. 10, 2011.

(30) Foreign Application Priority Data

Feb. 12, 2010    (CN) .......................... 2010 1 0113821

(51) Int. Cl.
*H04J 3/16* (2006.01)
*H04L 12/24* (2006.01)
*H04L 29/12* (2006.01)

(52) U.S. Cl.
CPC ......... *H04L 41/0853* (2013.01); *H04L 61/1511* (2013.01); *H04L 61/2015* (2013.01); *H04L 61/251* (2013.01); *H04L 61/2525* (2013.01); *H04L 61/2592* (2013.01)

(58) Field of Classification Search
CPC .............. H04L 29/06095; H04L 29/06; H04L 29/06068; H04L 12/46; H04L 29/06333; H04L 12/66; H04L 29/12066; H04L 61/1511; H04L 29/12009; H04L 41/0813
See application file for complete search history.

(56) References Cited

U.S. PATENT DOCUMENTS

| 2004/0133692 | A1 | 7/2004 | Blanchet et al. |
| 2005/0027834 | A1* | 2/2005 | Chen et al. ..................... 709/222 |

(Continued)

FOREIGN PATENT DOCUMENTS

| CN | 1744596 A | 3/2006 |
| CN | 1798136 A | 7/2006 |

(Continued)

OTHER PUBLICATIONS

Supplementary European Search Report dated Apr. 25, 2013 in connection with European Patent Application No. EP 11 74 1910.

(Continued)

*Primary Examiner* — Kibrom T Hailu

(57) ABSTRACT

The present invention discloses a method for obtaining IPv6 configuration information in an IPv6 transition network. The network includes an IPv4 network and an IPv6 network. An apparatus for providing IPv6 configuration information in the IPv4 network receives an IPv6 configuration information obtaining request packet sent by a user side device. In response, the apparatus sends a response packet to the user side device, where the response packet is a DHCPv4 packet, and carries the requested IPv6 configuration information. Some of the advantages of the present invention are that automatic configuration for a user side device which needs to traverse the IPv4 network to access the IPv6 network is implemented, and efficiency is greatly improved compared with a manual configuration method in the prior art.

20 Claims, 2 Drawing Sheets

(56) References Cited

U.S. PATENT DOCUMENTS

| | | | |
|---|---|---|---|
| 2005/0175020 A1 | 8/2005 | Park et al. | |
| 2006/0227792 A1 | 10/2006 | Wetterwald et al. | |
| 2007/0189219 A1* | 8/2007 | Navali et al. | 370/331 |
| 2007/0268919 A1 | 11/2007 | Sarikaya et al. | |
| 2009/0274062 A1 | 11/2009 | Yan et al. | |
| 2010/0177774 A1* | 7/2010 | Hart et al. | 370/392 |
| 2010/0202321 A1* | 8/2010 | Dec et al. | 370/254 |

FOREIGN PATENT DOCUMENTS

| | | |
|---|---|---|
| CN | 1859420 A | 11/2006 |
| CN | 101075944 A | 11/2007 |
| CN | 101127762 A | 2/2008 |
| CN | 101552723 A | 10/2009 |
| CN | 101707637 A | 5/2010 |
| CN | 101753635 A | 6/2010 |
| EP | 2 458 824 A1 | 5/2012 |

OTHER PUBLICATIONS

W. Townsley, et al., "IPv6 via IPv4 Service Provider Networks "6rd"", Internet Engineering Task Force, Feb. 3, 2010, 16 pages.

Written Opinion of the International Searching Authority dated May 19, 2011 in connection with International Patent Application No. PCT/CN2011/070908.

K. Moore, et al., "An Extensible Message Format for Delivery Status Notifications", Network Working Group, Jan. 2003, 40 pages.

W. Townsley, et al., "IPv6 via IPv4 Service Provider Networks "6rd"", Internet Engineering Task Force, Jan. 6, 2010, 17 pages.

R. Despres, "IPv6 Rapid Deployment on IPv4 infrastructures (6rd)", Internet Engineering Task Force, Apr. 7, 2009, 11 pages.

P. Traina, et al., "Autonomous System Confederations for BGP", Network Working Group, Feb. 2001, 11 pages.

Search Report dated Feb. 5, 2013 in connection with Chinese Patent Application No. 2010101138218.

International Search Report dated May 19, 2011 in connection with International Patent Application No. PCT/CN2011/070908.

* cited by examiner

METHOD FOR OBTAINING IPV6 CONFIGURATION INFORMATION IN IPV6 TRANSITION NETWORK, SYSTEM AND APPARATUS

CROSS-REFERENCE TO RELATED APPLICATIONS

This application is a continuation of International Application No. PCT/CN2011/070908, filed on Feb. 10, 2011, which claims priority to Chinese Patent Application No. 201010113821.8, filed on Jan. 12, 2010, both of which are hereby incorporated by reference in their entireties.

TECHNICAL FIELD

The present invention relates to the field of communications, and in particular, to a method for obtaining IPv6 configuration information in an IPv6 transition network, a network system and an apparatus for providing IPv6 configuration information.

BACKGROUND

At present, with the rapid popularization of network terminals, more and more network devices enters the Internet, and Internet Protocol (Internet Protocol, IP) addresses are needed for communication, which results in gradual exhaustion of Internet Protocol version 4 (IPv4) IP addresses in current use. However, an Internet Protocol version 6 (IPv6) is recognized as a core standard of the next generation Internet.

To support transition from an existing IPv4 to the IPv6, researchers have put forward multiple interworking technologies. A dual-stack (Dual-Stack) technology is the simplest, but the cost of upgrading all network infrastructures, services, applications and user terminals to dual-stack is extremely high. A tunnel technology can avoid whole network upgrading, and traversing an IPv4 network base is implemented through building an IPv6 over IPv4 tunnel between two ends of a network.

An IPv4-based IPv6 technology, such as 6to4, 6over4 and an intra-site automatic tunnel addressing protocol (Intra-Site Automatic Tunnel Addressing Protocol, ISATAP) and an IPv6 rapid deployment (6rd, IPv6 rapid deployment) technology are both methods for rapid deploying an IPv6 network in an IPv4 basic network, and in the two technologies, the IPv6 network is connected through building a stateless tunnel. In technologies such as the 6to4 and the 6rd, an Internet service provider (Internet Service Provider, ISP) may simply deploy an IPv6 gateway (6rd/6to4 border router) as a default centralized access point of the IPv6 network. A tunnel is built between a terminal or customer premises equipment (Customer Premises Equipment, CPE) and an IPv6 gateway device, an IPv6 user may traverse a network device that is not upgraded to the IPv6 and in the network through the tunnel, thereby avoiding large-scale upgrading of the network by the ISP. Therefore, the 6to4 and 6rd may assist rapid deployment of the IPv6 network.

Generally, the IPv6 network automatically configures an address and other parameters through a stateless address auto-configuration (Stateless Address Auto-configuration, SLAAC) packet and a dynamic host configuration protocol for IPv6 (Dynamic Host Configuration Protocol for IPv6, DHCPv6) packet, where SLAAC is a router advertisement (Router Advertisement) mechanism based on a neighbor discovery (Neighbor Discovery, ND) protocol.

However, in 6rd and 6to4 networks, an IPv6 packet is connected to an IPv6 gateway through a tunnel, and it is not suitable for the ND protocol and the DHCPv6 to run in the 6rd and 6to4 networks, because link broadcast needs to be used in both initial processes of the foregoing protocols. In the 6to4 technology, an IP address is usually configured manually. In the 6rd technology, both a manual manner and a DHCPv4 6rd Option manner in an IETF draft "draft-ietf-softwire-ipv6-6rd-03" may be adopted for configuration of an IP address. However, both the manual configuration and the DHCPv4 6rd Option can only configure the IP address, but cannot implement configuration of other IPv6 parameters at the same time, for example, cannot automatically obtain a default DNS server and the other IPv6 parameters.

In the prior art, although IPv6 default DNS server information and other default parameters may be commonly configured on the terminal or CPE equipment, due to the large number of terminals and CPEs, maintenance can hardly be performed through manual configuration, especially when a DNS server changes an address, all CPEs need to change configuration. In the prior art, the terminal or the CPE equipment may also directly use a default DNS of the IPv4 as a DNS server of the IPv6 network, and the terminal or the CPE equipment applies to the default DNS for a domain name through IPv4 connection. However, because the 6rd is still based on the IPv4 network, its DNS server probably does not support a request of an AAAA (an address length being four times of an IPv4 address length A) resource record (AAAA resource record).

SUMMARY

One object of the present invention is to provide a method for obtaining IPv6 configuration information in an IPv6 transition network, a network system and an apparatus for providing IPv6 configuration information.

The technical solutions of the present invention are as follows:

A method for obtaining IPv6 configuration information in an IPv6 transition network, where the network includes a user side device, an IPv4 network, and an IPv6 network, the user side device is connected to the IPv4 network, and the user side device supports an IPv6 rapid deployment IPv6 rapid deployment, 6rd technology, or supports an IPv4-based IPv6 technology, and an apparatus for providing IPv6 configuration information in the IPv4 network receives an IPv6 configuration information obtaining request packet sent by the user side device, where the request packet is a DHCPv4 packet, and includes identification information, and the identification information is used to identify IPv6 configuration information that the request packet requests to obtain; and the apparatus for providing IPv6 configuration information sends a response packet to the user side device, where the response packet is a DHCPv4 packet, and carries the IPv6 configuration information that the request packet requests to obtain.

An apparatus for providing IPv6 configuration information, where the apparatus for providing IPv6 configuration information includes:

an IPv6 configuration information obtaining request packet parsing unit, configured to parse an IPv6 configuration information obtaining request packet from a user side device, and determine, according to identification information in the packet, IPv6 configuration information that the user side device requests to obtain, where the request packet is a DHCPv4 packet; and an IPv6 configuration information sending unit, configured to construct a response packet carrying the IPv6 configuration information that the user side device requests to obtain, and send the response packet to the requester, where the response packet is a DHCPv4 packet.

A network system, including an IPv4 network which includes an apparatus for providing IPv6 configuration information and an IPv6 network which includes a DHCPv6 Server, where the apparatus for providing IPv6 configuration information receives an IPv6 configuration information obtaining request packet sent by a user side device, where the request packet is a DHCPv4 packet, and includes identification information, and the identification information is used to identify IPv6 configuration information that the request packet requests to obtain; and the apparatus for providing IPv6 configuration information sends a response packet carrying the IPv6 configuration information that the request packet requests to obtain to the user side device, where the response packet carries the configuration information that the request packet requests to obtain.

The advantages of the present invention lie in that automatic configuration for a user side device which needs to traverse the IPv4 network to access the IPv6 network is implemented, and efficiency is greatly improved compared with a manual configuration method in the prior art.

DETAILED DESCRIPTION

Figure 1:
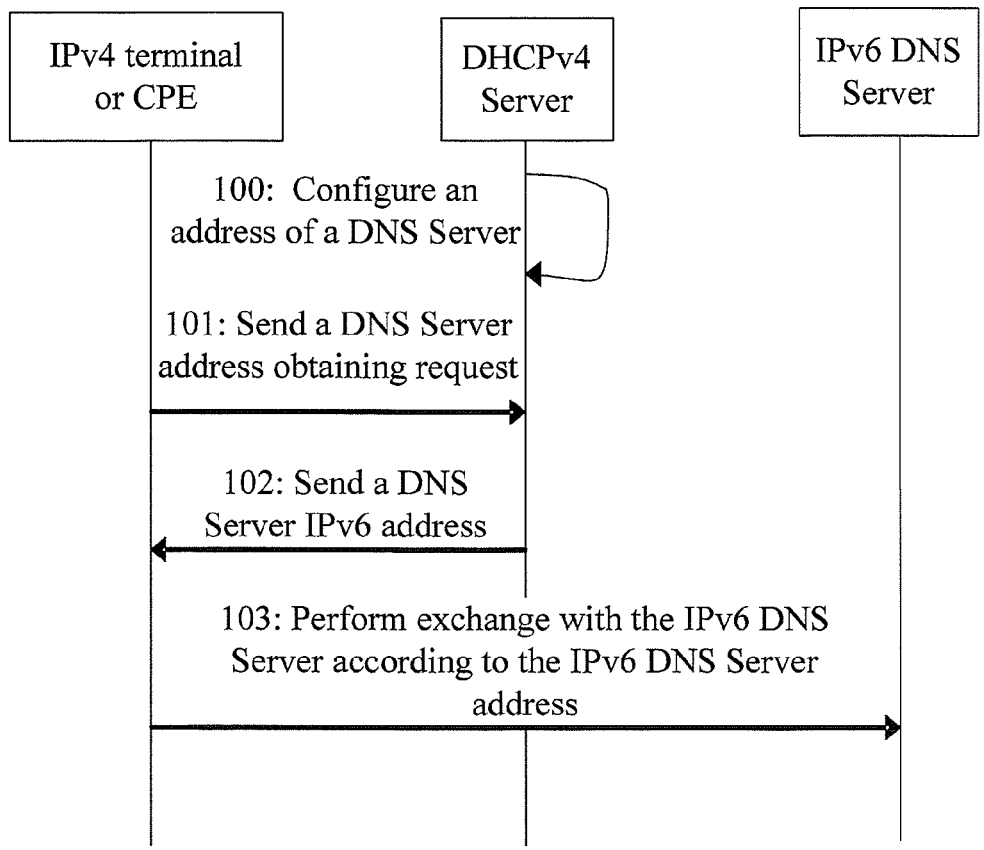
FIG. 1 is a flow chart of a method according to an embodiment of the present invention.

The present invention is described in detail below with reference to the accompanying drawings and specific embodiments. It should be noted that, the following embodiments are merely intended to help understand examples of the technical solutions, but not intended to limit the present invention.

The present invention provides a method for obtaining IPv6 configuration information in an IPv6 transition network, where the IPv6 transition network includes an IPv4 network and an IPv6 network. The network may further include a user side device, where the user side device is connected to the IPv4 network. For example, the user side device supports an IPv6 rapid deployment (IPv6 rapid deployment, 6rd) technology or other technologies supporting IPv4-based IPv6, such as a 6to4 technology, and an intra-site automatic tunnel addressing protocol (Intra-Site Automatic Tunnel Addressing Protocol, ISATAP) technology.

In an embodiment of the present invention, the user side device sends an IPv6 configuration information obtaining request packet to an apparatus for providing IPv6 configuration information in the IPv4 network, and the apparatus for providing IPv6 configuration information supports a dynamic host configuration protocol for IPv4 (Dynamic Host Configuration Protocol for IPv4, DHCPv4), where the IPv6 configuration information obtaining request packet is a DHCPv4 packet, and includes identification information used to identify the IPv6 configuration information that needs to be obtained.

In the embodiment of the present invention, the apparatus for providing IPv6 configuration information may be implemented by a DHCPv4 Server or integrated in a DHCPv4 Server.

The apparatus for providing IPv6 configuration information in the IPv4 network receives the IPv6 configuration information obtaining request packet sent by the user side device, queries, according to the identification information in the request packet, whether it maintains the IPv6 configuration information corresponding to the identification information, and sends a response packet carrying the IPv6 configuration information to the user side device after it is found through querying that the IPv6 configuration information is maintained. The response packet is a DHCPv4 packet, and the IPv6 configuration information may be carried in an option (Option) field of the response packet.

The user side device receives the response packet sent by the apparatus for providing IPv6 configuration information;

The user side device parses the response packet, and obtains the IPv6 configuration information.

In the embodiment of the present invention, the user side device may be customer premises equipment (Customer Premises Equipment, CPE) or an IPv4 terminal; the IPv6 configuration information is an IPv6 address of a domain name server DNS Server in the IPv6 network, or an IPv6 address of a dynamic host configuration protocol for IPv6 network server DHCPv6 Server.

In the embodiment of the present invention, the CPE may be connected to an IPv6 terminal. In this case, after obtaining the IPv6 configuration information by parsing the response packet, the CPE advertises it to the IPv6 terminal on the basis of a specific protocol run between the CPE and the IPv6 terminal. If a neighbor discovery (Neighbor Discovery, ND) protocol is run between the CPE and the IPv6 terminal, a router advertisement (Router Advertisement, RA) packet carrying the IPv6 configuration information is sent to the IPv6 terminal, so as to send the IPv6 configuration information to the IPv6 terminal. If the IPv6 terminal adopts a dynamic host configuration protocol for IPv6 (Dynamic Host Configuration Protocol for IPv6, DHCPv6) to request the IPv6 configuration information from the CPE, the CPE sends a DHCPv6 configuration information request packet to the DHCPv6 Server in a DHCP relay manner by unicasting.

The IPv6 terminal performs information exchange with the IPv6 network according to the IPv6 configuration information.

In an embodiment of the present invention as shown in FIG. 1, an IPv4 terminal or a customer premises equipment (Customer Premise Equipment, CPE), where the IPv4 terminal or the customer premises equipment supports an IPv6 rapid deployment (IPv6 rapid deployment, 6rd) technology or supports an IPv4-based IPv6 (such as 6to4 and ISATAP) technology, is connected to an IPv6 network through an IPv4 network.

In this embodiment, IPv6 configuration information is previously configured in an apparatus for providing IPv6 configuration information in the IPv4 network. In this embodiment, the apparatus for providing IPv6 configuration information is a dynamic host configuration protocol server for IPv4 (DHCPv4 Server), the IPv6 configuration information is an IPv6 address of a domain name system (Domain Name System, DNS) server of the IPv6 network. The IPv4 terminal or the CPE obtains a DNS IPv6 address of the IPv6 network from the DHCPv4 Server through the IPv4 network.

The IPv4 terminal or the CPE uses the DNS IPv6 address as a target address, passes the IPv4 network in a tunnel manner, and accesses the DNS server in the IPv6 network.

Specifically, this embodiment includes:

100: Configure the IPv6 configuration information in the DHCPv4 Sever in the IPv4 network, where in this embodiment, the IPv6 configuration information is the IPv6 address of the DNS Server in the IPv6 network.

101: The IPv4 terminal or the CPE sends a DNS Server IPv6 address obtaining request to the DHCPv4 Server.

The DNS Server IPv6 address obtaining request includes identification information, where the identification information identifies that an address that the address obtaining request requests to obtain is the IPv6 address of the DNS Server in the IPv6 network.

For example, in this embodiment, the DNS Server IPv6 address obtaining request is a DHCPv4 request packet sent by the IPv4 terminal or the CPE, an option (Option) field of the DHCPv4 request packet includes the identification information, which identifies that the DHCPv4 request packet request requests to obtain the IPv6 address of the DNS server in the IPv6 network.

102: The DHCPv4 Server receives the DNS Server IPv6 address obtaining request, and sends the DNS Server IPv6 address to the IPv4 terminal or the CPE.

The DHCPv4 Server queries whether it includes the DNS Server IPv6 address that the IPv6 address obtaining request of the DNS Server requests to obtain, when the DHCPv4 Server determines that the IPv6 address of the DNS Server is included, a response packet carrying the DNS Server IPv6 address is sent to the IPv4 terminal or the CPE.

Specifically, in this embodiment, the DHCPv4 Server receives the DHCPv4 request packet that includes the identification information and is sent by the IPv4 terminal or the CPE, and obtains the identification information from the Option field of the packet, and queries, according to the identification information, whether the DHCPv4 Server includes content corresponding to the identification information, that is, whether the IPv6 address of the DNS Server is included.

When it is determined that the DNS Server IPv6 address is included, the DHCPv4 Server sends a DHCPv4 ack (DHCPv4 ack) packet to the IPv4 terminal or the CPE, and an Option field in the DHCPv4 ack packet includes the DNS Server IPv6 address that the IPv4 terminal or the CPE requests to obtain, and a specific format of the Option field is as shown in the following Table 1, where OPT_IPv6_DNS is identification information, used to identify that content of the Option field is the DNS Server IPv6 address that the IPv4 terminal or the CPE requests to obtain; option-length is length information, used to represent the length of this Option; and content of IPv6 Addresses of Default DNS Servers is an IPv6 address of one or multiple DNS Servers.

In this embodiment, the Option field is included in the DHCPv4 ack packet. For example, the Option field may also be included in another packet sent to the IPv4 terminal or the CPE by the DHCPv4 Server.

TABLE 1

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    OPT_IPv6_DNS   |    option-length      |                    |
+-+-+-+-+-+-+-+-+-+-+-+-+-+-+-+-+-+-+-+-+-+-+                    |
|                   IPv6 Addresses of Default IPv6 DNS Servers   |
|                                                                |
|                                                                |
|                                  +-+-+-+-+-+-+-+-+-+-+-+-+-+-+-+
|                                  |
+-+-+-+-+-+-+-+-+-+-+-+-+-+-+-+-+-+
```

103: The IPv4 terminal or the CPE uses the DNS Server IPv6 address as a target address to perform information exchange with the DNS Server. For example, the exchange may be performed through a tunnel built between the IPv4 terminal or the CPE and a gateway of the IPv6 network.

When the CPE is connected to the IPv6 terminal, the IPv6 terminal cannot directly obtain the IPv6 configuration information from the DHCPv4 Server, and may perform information exchange with the DHCPv4 Server through the CPE, and then forward the information to the IPv6 terminal. In this case, if the IPv6 configuration information obtained by the CPE is the IPv6 address of the DNS Server, the CPE sends a DHCPv6 packet carrying the IPv6 address of the DNS Server to the IPv6 terminal on the basis of a DHCPv6 protocol run between the CPE and the IPv6 terminal, so as to send the IPv6 address of the DNS Server to the IPv6 terminal, and may also make an advertisement to the IPv6 terminal through an RA message of the ND protocol.

Figure 2:
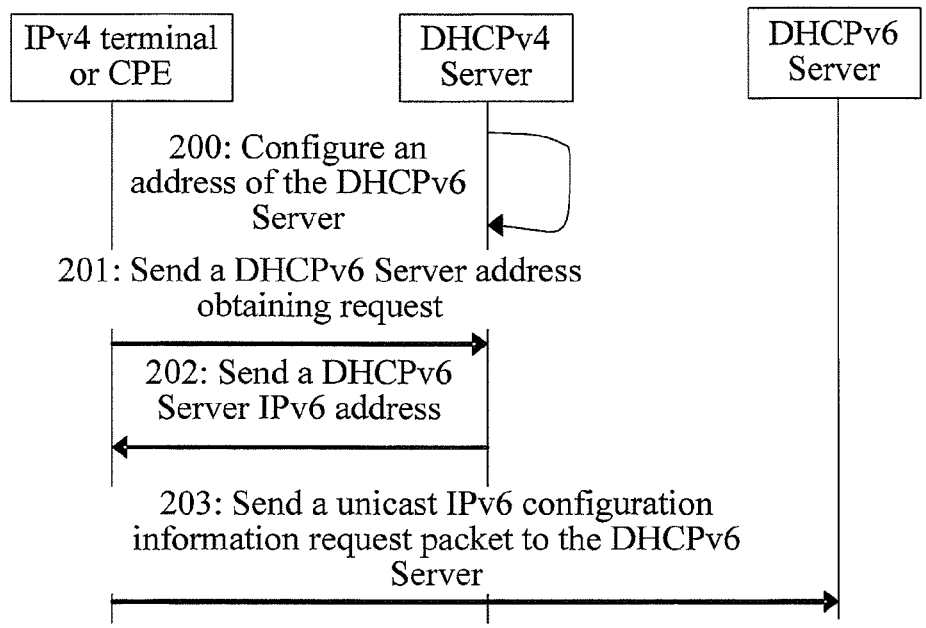
FIG. 2 is a flow chart of a method according to an embodiment of the present invention.

In an embodiment of the present invention as shown in FIG. 2, an IPv4 terminal or a customer premises equipment (Customer Premise Equipment, CPE), where the IPv4 terminal or the customer premises equipment supports an IPv6 rapid deployment (IPv6 rapid deployment, 6rd) technology or supports an IPv4-based IPv6 (such as 6to4 and ISATAP) technology, is connected to an IPv6 network through an IPv4 network.

In this embodiment, an IPv6 address of a DHCPv6 Server of the IPv6 network is configured in an apparatus for providing IPv6 configuration information of the IPv4 network. The apparatus for providing IPv6 configuration information in this embodiment is a DHCPv4 Server of the IPv4 network. The IPv4 terminal or the CPE obtains the IPv6 address of the DHCPv6 Server of the IPv6 network from the DHCPv4 Server through the IPv4 network. The IPv4 terminal or the CPE uses the IPv6 address of the DHCPv6 Server as a target address to send a unicast DHCPv6 packet, passes the IPv4 network in a tunnel manner, performs information exchange with the DHCPv6 Server, and further obtains information it needs from the DHCPv6 Server.

Specifically, this embodiment includes:

200: Configure, in the DHCPv4 Sever of the IPv4 network, the IPv6 address of the DHCPv6 Server in the IPv6 network.

201: The IPv4 terminal or the CPE sends a DHCPv6 Server IPv6 address obtaining request to the DHCPv4 Server.

The DHCPv6 Server IPv6 address obtaining request includes identification information, where the identification information identifies that an address that the address obtaining request requests to obtain is the IPv6 address of the DHCPv6 Server in the IPv6 network.

Specifically, in this embodiment, the DHCPv6 Server IPv6 address obtaining request is a DHCPv4 request packet sent by the IPv4 terminal or the CPE, an option (Option) field of the DHCPv4 request packet includes the identification information, which identifies that the DHCPv4 request packet request requests to obtain the IPv6 address of the DHCPv6 Server in the IPv6 network.

202: The DHCPv4 Server receives the DHCPv6 Server IPv6 address obtaining request and sends the DHCPv6 Server IPv6 address to the IPv4 terminal or the CPE.

Specifically, the DHCPv4 Server queries whether it includes the DHCPv6 Server IPv6 address that the DHCPv6 Server IPv6 address obtaining request requests to obtain, when the DHCPv4 Server determines that the DHCPv6 Server IPv6 address is included, a response packet carrying the DHCPv6 Server IPv6 address is sent to the IPv4 terminal or the CPE.

In this embodiment, the DHCPv4 Server receives the DHCPv4 request packet including the identification information, obtains the identification information from the Option field of the packet, and queries, according to the identification information, whether the DHCPv4 Server includes content corresponding to the identification information, that is, whether the IPv6 address of the DHCPv6 Server is included.

When it is determined the DHCPv6 Server IPv6 address is included, the DHCPv4 Server sends a DHCPv4 ack packet to the IPv4 terminal or the CPE, an Option field in the DHCPv4 ack packet includes the DHCPv6 Server IPv6 address that the IPv4 terminal or the CPE requests to obtain, and a specific format of the Option field is as shown in the following Table 2, where OPT_IPv6DHCP6 is identification information, used to identify that content of the Option field is the DHCPv6 Server IPv6 address that the IPv4 terminal or the CPE requests to obtain; option-length is length information, used to represent the length of this Option; and content of IPv6 Addresses of DHCPv6 Servers is the IPv6 address of the DHCPv6 Server.

In this embodiment, the Option field is included in the DHCPv4 ack packet. For example, the Option field may also be included in another packet sent to the IPv4 terminal or the CPE by the DHCPv4 Server.

tion information may include an IPv6 address of a DNS Server in the IPv6 network and/or other IPv6 configuration information.

When the CPE is connected to an IPv6 terminal, after obtaining the IPv6 address of the DHCPv6 Server, the CPE, as a DHCP relay (relay), transmits the received DHCPv6 configuration information request packet to the DHCPv6 Server by unicasting. In this way, a DHCPv6 server address does not need to be manually configured in a DHCPv6 relay.

Figure 3:
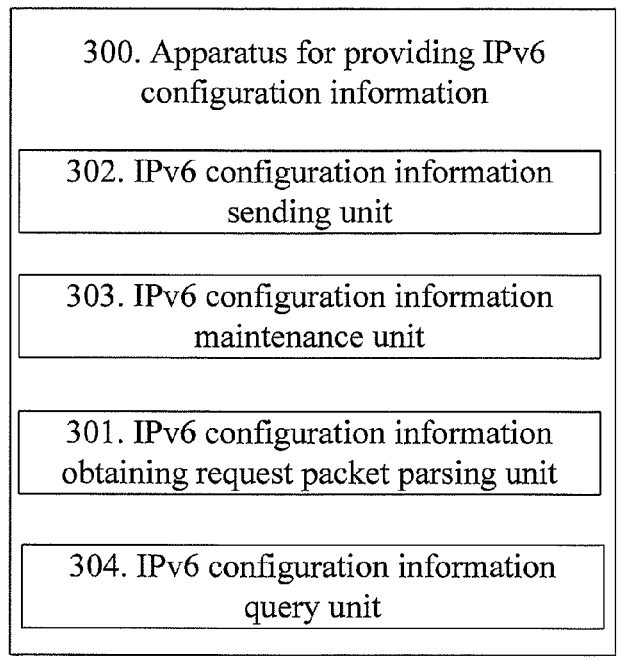
FIG. 3 is a schematic diagram of an apparatus according to an embodiment of the present invention.

FIG. 3 is a schematic diagram of an apparatus according to an embodiment of the present invention, as shown in FIG. 3, an apparatus for providing IPv6 configuration information 300 in this embodiment supports a DHCPv4 protocol, and includes an IPv6 configuration information obtaining request packet parsing unit 301, and an IPv6 configuration information sending unit 302.

The apparatus for providing IPv6 configuration information may be applied in an IPv6 transition network to provide configuration information of an IPv6 network for a user side device. The IPv6 transition network includes the user side device, an IPv4 network including the apparatus for providing IPv6 configuration information and an IPv6 network including a DHCPv6 Server or a DNS Server, where the user side device is connected to the IPv4 network, and the user side device supports an IPv6 rapid deployment IPv6 rapid deployment, 6rd technology, or supports an IPv4-based IPv6 technology, such as 6to4 and ISATAP.

After the user side device sends an IPv6 configuration information obtaining request packet to the apparatus for providing IPv6 configuration information in the IPv4 network, the apparatus for providing IPv6 configuration information receives the request packet, and the IPv6 configuration information obtaining request packet parsing unit 301 parses the request packet, obtains, from the request packet, identification information which is used to identify IPv6 configuration information that the obtaining request packet requests to obtain, and determines the IPv6 configuration information that a requester requests to obtain. The IPv6 configuration information obtaining request packet is a DHCPv4 packet.

After the apparatus for providing IPv6 configuration information determines that it maintains the IPv6 configuration information, the IPv6 configuration information sending unit 302 constructs a response packet carrying the IPv6 configu-

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    OPT_IPv6_DHCP6     |    option-length      |                |
+-+-+-+-+-+-+-+-+-+-+-+-+-+-+-+-+-+-+-+-+                        |
|                                                                |
|                    IPv6 Addresses of DHCPv6 Servers            |
|                                                                |
|                                                                |
|                       +-+-+-+-+-+-+-+-+-+-+-+-+-+-+-+-+-+-+-+-+
|                       |
+-+-+-+-+-+-+-+-+-+-+-+-+
```

203: The IPv4 terminal or the CPE sends a unicast DHCPv6 configuration information request packet to the DHCPv6 Server according to the IPv6 address of the DHCPv6 Server, and further obtains required configuration information from the DHCPv6 Server, where the configuraration information and sends the response packet to the requester. The response packet adopts the DHCPv4 protocol, and the IPv6 configuration information is included in an option field of the response packet. The response packet is a DHCPv4 packet.

The apparatus for providing IPv6 configuration information further includes an IPv6 configuration information maintenance unit 303.

The IPv6 configuration information maintenance unit 303 is configured to maintain the configuration information of the IPv6 network, where the configuration information may include an IPv6 address of the DNS Server of the IPv6 network or an IPv6 address of the DHCPv6 Server of the IPv6 network.

The apparatus for providing IPv6 configuration information further includes an IPv6 configuration information query unit 304, configured to, after the apparatus for providing IPv6 configuration information determines the IPv6 configuration information that the requester requests to obtain, query whether the apparatus for providing IPv6 configuration information maintains the IPv6 configuration information that the requester requests to obtain.

The apparatus for providing IPv6 configuration information may be implemented by a DHCPv4 Server or integrated in a DHCPv4 Server.

Figure 4:
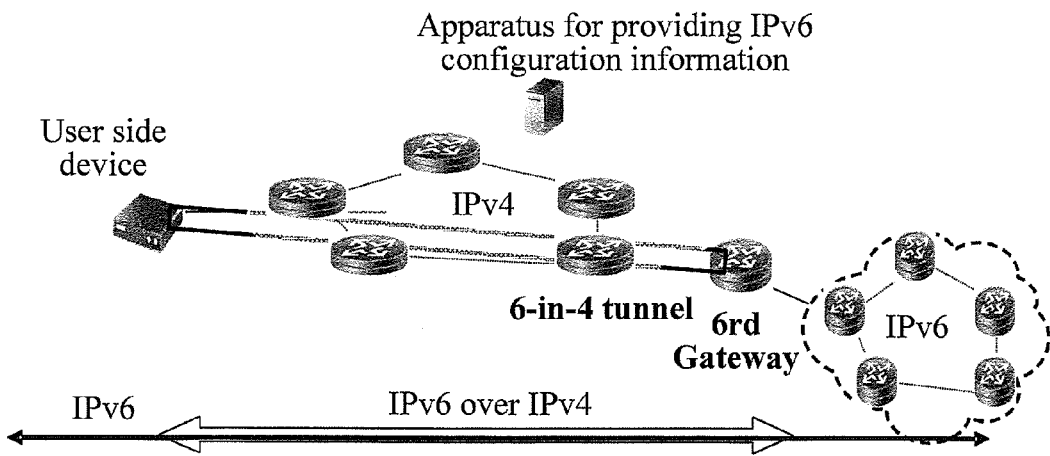
FIG. 4 is a schematic diagram of a system according to an embodiment of the present invention.

As shown in FIG. 4, the present invention further provides a network system, including an IPv4 network and an IPv6 network. The IPv4 network includes an apparatus for providing IPv6 configuration information supporting a DHCPv4 protocol, and the IPv6 network includes a DNS server or a DHCPv6 Server. The network system further includes a user side device, where the user side device supports an IPv6 rapid deployment IPv6 rapid deployment, 6rd technology, or supports an IPv4-based IPv6 technology, such as 6to4 and ISATAP. The user side device is connected to the IPv4 network, but is not connected to the IPv6 network.

In an IPv6 transition network system in an embodiment of the present invention, the apparatus for providing IPv6 configuration information may be a DHCPv4 Server, and may also be another apparatus which is capable of providing the IPv6 configuration information and supports the DHCPv4 protocol.

The apparatus for providing IPv6 configuration information in the IPv4 network receives an IPv6 configuration information obtaining request packet sent by the user side device, where the request packet is a DHCPv4 packet, and includes identification information used to identify IPv6 configuration information that needs to be obtained.

The apparatus for providing IPv6 configuration information queries, according to the identification information in the request packet, whether it maintains IPv6 configuration information corresponding to the identification information, and sends a response packet carrying the IPv6 configuration information to the user side device after it is found through querying that the IPv6 configuration information is maintained. The response packet is a DHCPv4 packet, and the IPv6 configuration information may be carried in an option (Option) field of the response packet.

The user side device receives the response packet sent by the apparatus for providing IPv6 configuration information.

The user side device parses the response packet, and obtains the IPv6 configuration information.

In the system embodiment of the present invention, the user side device may be customer premises equipment (Customer Premises Equipment, CPE) or an IPv4 terminal. The IPv6 configuration information is an IPv6 address of the DNS Server in the IPv6 network, or an IPv6 address of the DHCPv6 Server in the IPv6 network.

In the system embodiment of the present invention, the CPE may be connected to an IPv6 terminal. In this case, after obtaining the IPv6 configuration information, the CPE advertises it to the terminal on the basis of a specific protocol run between the CPE and the IPv6 terminal. If a neighbor discovery (Neighbor Discovery, ND) protocol is run between the CPE and the IPv6 terminal, a router advertisement (Router Advertisement, RA) packet carrying the IPv6 configuration information is sent to the IPv6 terminal, so as to send the IPv6 configuration information to the IPv6 terminal. If the IPv6 terminal adopts a dynamic host configuration protocol for IPv6 (Dynamic Host Configuration Protocol for IPv6, DHCPv6) to request the IPv6 configuration information from the CPE, the CPE sends a DHCPv6 configuration information request packet to the DHCPv6 Server in a DHCP relay manner by unicasting.

The IPv6 terminal performs information exchange with the IPv6 network according to the IPv6 configuration information.

After the user side device obtains the IPv6 address of the DNS Server of the IPv6 network, the user side device performs information exchange with the DNS Server. For example, the information exchange may be implemented in a manner of building a tunnel between a user side and the IPv6 network, an IPv6 address of a domain name that the user side device needs to access is obtained, and access to a target device in the IPv6 network is implemented.

After the user side device obtains the IPv6 address of the DHCPv6 Server of the IPv6 network, the user side device performs information exchange with the DHCPv6 Server. For example, the information exchange may be implemented in a manner of building a tunnel between a user side and the IPv6 network, IPv6 configuration information needed when the user side device accesses the IPv6 network is obtained, access to the IPv6 network may be implemented after the IPv6 configuration information is obtained. The IPv6 configuration information may include the IPv6 address of the DNS Server in the IPv6 network or other configuration information.

Persons of ordinary skill in the art may understand that, all or part of the steps according to the foregoing method embodiments may be implemented by a program instructing relevant hardware. The program may be stored in a computer readable storage medium. When the program is executed, the steps of the foregoing method embodiments are executed. The storage medium includes any medium that is capable of storing program codes, such as a ROM, a RAM, a magnetic disk, or a compact disk.

The foregoing descriptions are merely specific exemplary embodiments of the present invention, but are not intended to limit the protection scope of the present invention. Any variation or replacement easily derived by persons skilled in the art within the technical scope disclosed in the present invention shall fall within the protection scope of the present invention.

What is claimed is:

1. A method for obtaining Internet Protocol version 6 (IPv6) configuration information in an IPv6 transition network, wherein the network comprises a user side device, an Internet Protocol version 4 (IPv4) network and an IPv6 network, the user side device is coupled to the IPv4 network, and the user side device supports an IPv6 rapid deployment (6rd) technology or an IPv4 -based IPv6 technology, the method comprising:

receiving, by an apparatus for providing IPv6 configuration information in the IPv4 network, an IPv6 configuration information obtaining request packet sent by the user side device, wherein the request packet is a Dynamic Host Configuration Protocol for IPv4 (DHCPv4) packet and comprises identification information operable for identifying requested IPv6 configuration information; and sending, by the apparatus for providing IPv6 configuration information, a response packet to the user side device, wherein the response packet is a DHCPv4 packet and carries the requested IPv6 configuration information.

2. The method according to claim 1, wherein after receiving the IPv6 configuration information obtaining request packet sent by the user side device, the apparatus for providing IPv6 configuration information in the IPv4 network queries, according to the identification information in the request packet, whether it maintains the IPv6 configuration information corresponding to the identification information and sends the response packet carrying the requested IPv6 configuration information to the user side device after it is found through querying that the requested IPv6 configuration information is maintained, and the requested IPv6 configuration information is carried in an option field of the response packet.

3. The method according to claim 1, wherein the user side device is customer premises equipment (CPE) or an IPv4 terminal.

4. The method according to claim 3, wherein the apparatus for providing IPv6 configuration information is configured with the requested IPv6 configuration information; and
the requested IPv6 configuration information is an IPv6 address of a domain name server (DNS Server) in the IPv6 network, or is an IPv6 address of a dynamic host configuration protocol for IPv6 network server (DHCPv6 Server) configured for the IPv6 network.

5. The method according to claim 4, wherein when the CPE is connected to an IPv6 terminal, the CPE sends a router advertisement (RA) packet carrying the requested IPv6 configuration information to the IPv6 terminal on the basis of a neighbor discovery (ND) protocol run between the CPE and the IPv6 terminal after obtaining the requested IPv6 configuration information, so as to send the requested IPv6 configuration information to the IPv6 terminal.

6. The method according to claim 4, wherein when the CPE is connected to an IPv6 terminal, and when the requested IPv6 configuration information obtained by the CPE is the IPv6 address of the DNS Server, the CPE sends a DHCP packet carrying the IPv6 address of the DNS Server to the IPv6 terminal on the basis of a DHCP protocol run between the CPE and the IPv6 teiminal, so as to send the IPv6 address of the DNS Server to the IPv6 terminal.

7. The method according to claim 4, wherein when the CPE is connected to an IPv6 terminal, and the requested IPv6 configuration information is the IPv6 address of the DHCPv6 Server of the IPv6 network, the CPE, as a DHCP relay, transmits a DHCPv6 configuration information request packet to the DHCPv6 Server in a unicast manner.

8. A method for obtaining Internet Protocol version 6 (IPv6) configuration information in an IPv6 transition network, wherein the network comprises a user side device, an Internet Protocol version 4 (IPv4) network and an IPv6 network, the user side device is coupled to the IPv4 network, and the user side device supports an IPv6 rapid deployment (6rd) technology or an IPv4-based IPv6 technology, the method comprising:
sending, by the user side device, an IPv6 configuration information obtaining request packet to an apparatus for providing IPv6 configuration information in the IPv4 network, wherein the request packet is a Dynamic Host Configuration Protocol for IPv4 (DHCPv4) packet and comprises identification information operable for identifying requested IPv6 configuration information; and
receiving, by the user side device, a response packet sent by the apparatus for providing IPv6 configuration information, wherein the response packet is a DHCPv4 packet and carries the requested IPv6 configuration information; and
parsing, by the user side device, the response packet and obtaining the requested IPv6 configuration information.

9. An apparatus for providing Internet Protocol version 6 (IPv6) configuration information, the apparatus comprising:
an IPv6 configuration information obtaining request packet parsing unit, configured to parse an IPv6 configuration information obtaining request packet from a user side device, and determine, according to identification information in the packet, requested IPv6 configuration information, wherein the request packet is a Dynamic Host Configuration Protocol for IPv4 (DHCPv4);
an IPv6 configuration information sending unit, configured to construct a response packet carrying the requested IPv6 configuration information, and send the response packet to the user side device, wherein the response packet is a DHCPv4 packet.

10. The apparatus for providing IPv6 configuration information according to claim 9, wherein the apparatus further comprises:
an IPv6 configuration information maintenance unit, configured to maintain the requested IPv6 configuration information of the IPv6 network.

11. The apparatus for providing IPv6 configuration information according to claim 9, wherein the apparatus further comprises:
an IPv6 configuration information query unit, configured to query whether it maintains the requested IPv6 configuration information.

12. A network system, comprising:
an Internet Protocol version 4 (IPv4) network comprising an apparatus for providing Internet Protocol version 6 (IPv6) configuration information;
an IPv6 network comprising an IPv6 network server (DHCPv6 Server);
the apparatus for providing IPv6 configuration information receives an IPv6 configuration information obtaining request packet sent by a user side device, wherein the request packet is a Dynamic Host Configuration Protocol for IPv4 (DHCPv4) packet and comprises identification information operable for identifying requested IPv6 configuration information; and
the apparatus for providing IPv6 configuration information sends a response packet carrying the requested IPv6 configuration information.

13. The system according to claim 12, wherein the apparatus for providing IPv6 configuration information is further configured to query, according to the identification information and after receiving the IPv6 configuration information obtaining request packet, whether it maintains the requested IPv6 configuration information and send the response packet to the user side device after it is found through querying that the requested IPv6 configuration information is maintained, wherein the requested IPv6 configuration information is carried in an option field of the response packet.

14. The system according to claim 12, wherein:
the user side device is customer premises equipment (CPE) or an IPv4 terminal;
the apparatus for providing IPv6 configuration information is configured with the requested IPv6 configuration information; and
the requested IPv6 configuration information is an IPv6 address of a domain name server (DNS Server) of the IPv6 network, or is an IPv6 address of a dynamic host configuration protocol for the DHCPv6 Server.

15. The system according to claim 14, wherein:
when the CPE is connected to an IPv6 terminal, after obtaining the requested IPv6 configuration information, the CPE sends a router advertisement (RA) packet carrying the requested IPv6 configuration information to the IPv6 terminal on the basis of a neighbor discovery (ND) protocol run between the CPE and the IPv6 terminal, so as to send the requested IPv6 configuration information to the IPv6 terminal.

16. The system according to claim 14, wherein:
when the CPE is connected to an IPv6 terminal, and when the requested IPv6 configuration information obtained by the CPE is the IPv6 address of the DNS Server, the CPE sends a DHCP packet carrying the IPv6 address of the DNS Server to the IPv6 terminal on the basis of a DHCP protocol run between the CPE and the IPv6 terminal, so as to send the IPv6 address of the DNS Server to the IPv6 terminal.

17. The system according to claim 14, wherein when the CPE is connected to an IPv6 terminal, and the requested IPv6 configuration information is the IPv6 address of the DHCPv6 Server of the IPv6 network, the CPE, as a DHCP relay, transmits a DHCPv6configuration information request packet to the DHCPv6 Server in a unicast manner.

18. The method according to claim 1, wherein the requested IPv6 configuration information is an IPv6 address of a server associated with the IPv6 network, and the method further comprises:
determining, by the apparatus, whether the requested IPv6 configuration information is maintained by the apparatus; and if maintained, sending, by the apparatus, the IPv6 address of the server in the response packet to the user side device.

19. The method according to claim 8, wherein the requested IPv6 configuration information is an IPv6 address of a server associated with the IPv6 network.

20. The apparatus according to claim 9, wherein the requested IPv6 configuration information is an IPv6 address of a server associated with the IPv6 network, and the apparatus further comprises:
an IPv6 configuration information query unit, configured to query whether the apparatus maintains the requested IPv6 configuration information; and
when maintained by the apparatus, the IPv6 configuration information sending unit is further configured to sending the IPv6 address of the server in the response packet to the user side device.

* * * * *